Figure 3:
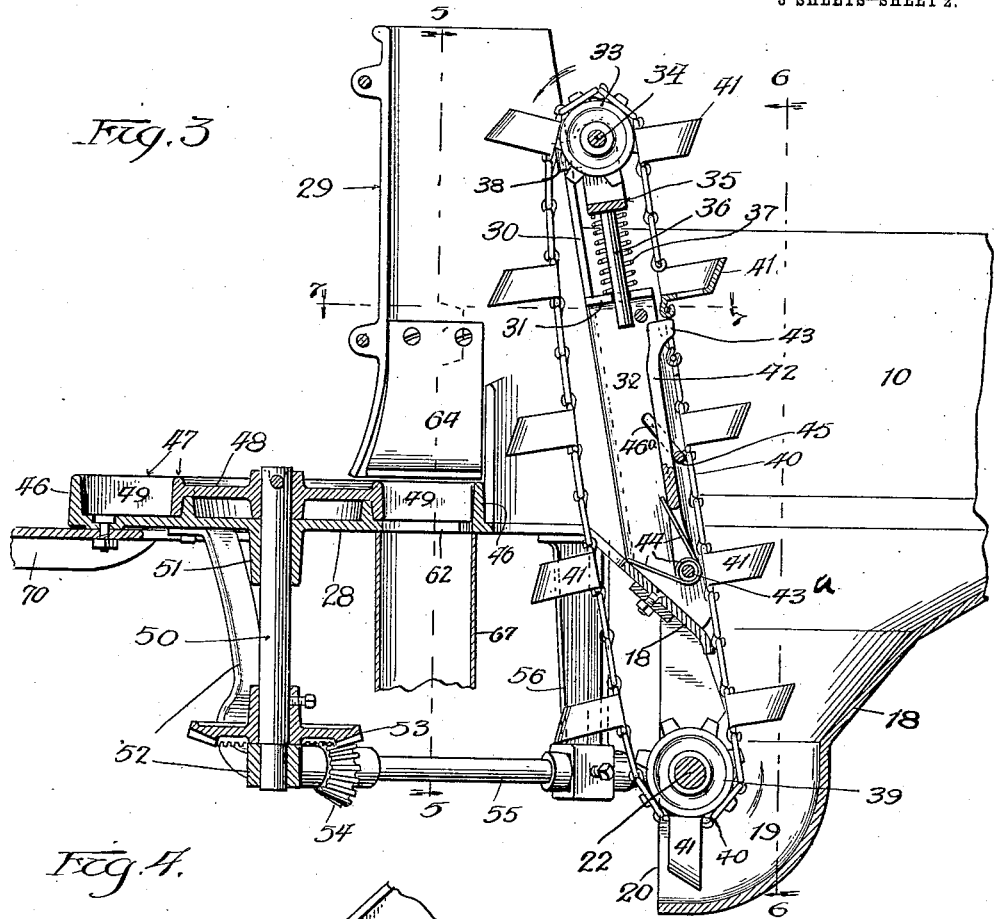

O. KNOERZER.
POTATO PLANTER.
APPLICATION FILED JUNE 12, 1912.
1,070,898.
Patented Aug. 19, 1913.
3 SHEETS—SHEET 1.
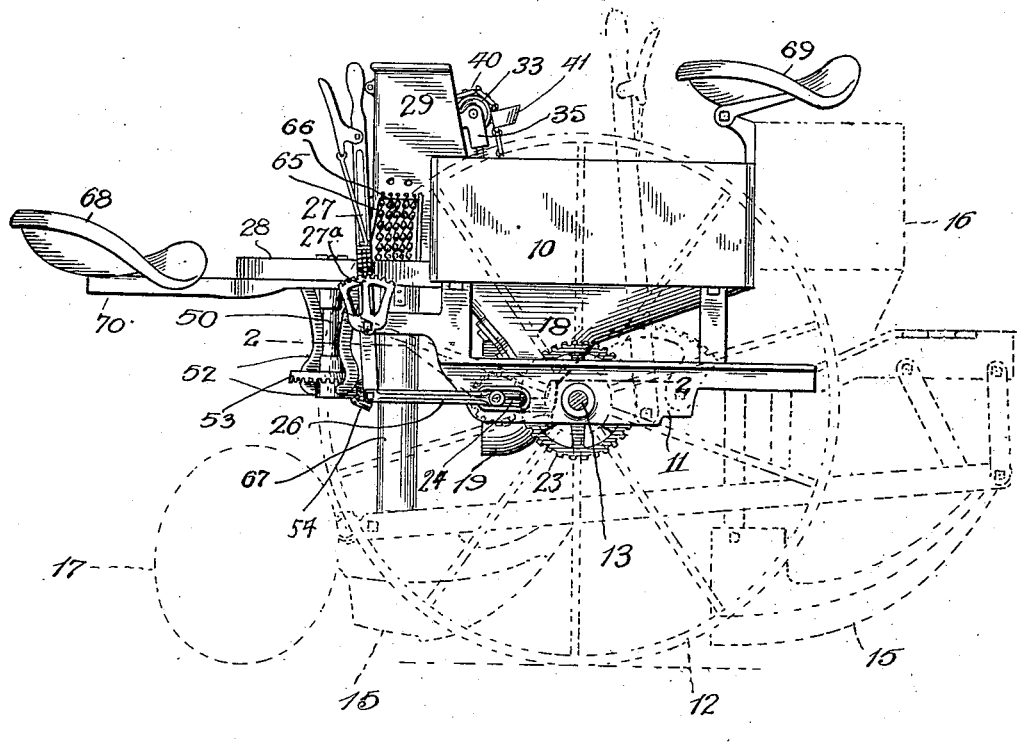
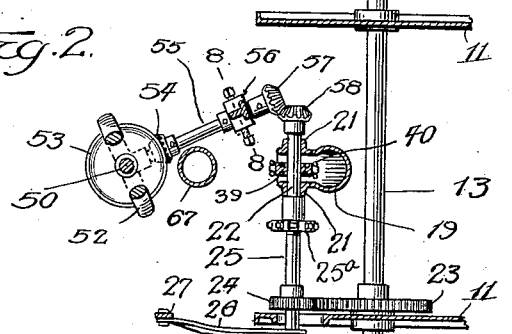
Witnesses:
Fannie F. Richards
Frank Haul
Inventor:
Otto Knoerzer,
by Charles O. Shervy
his Atty.

O. KNOERZER.
POTATO PLANTER.
APPLICATION FILED JUNE 12, 1912.

1,070,898.

Patented Aug. 19, 1913.

3 SHEETS—SHEET 2.

Witnesses:
Fannie F. Richards
Frank Haul

Inventor:
Otto Knoerzer,
by Charles O. Shurvey
his Atty

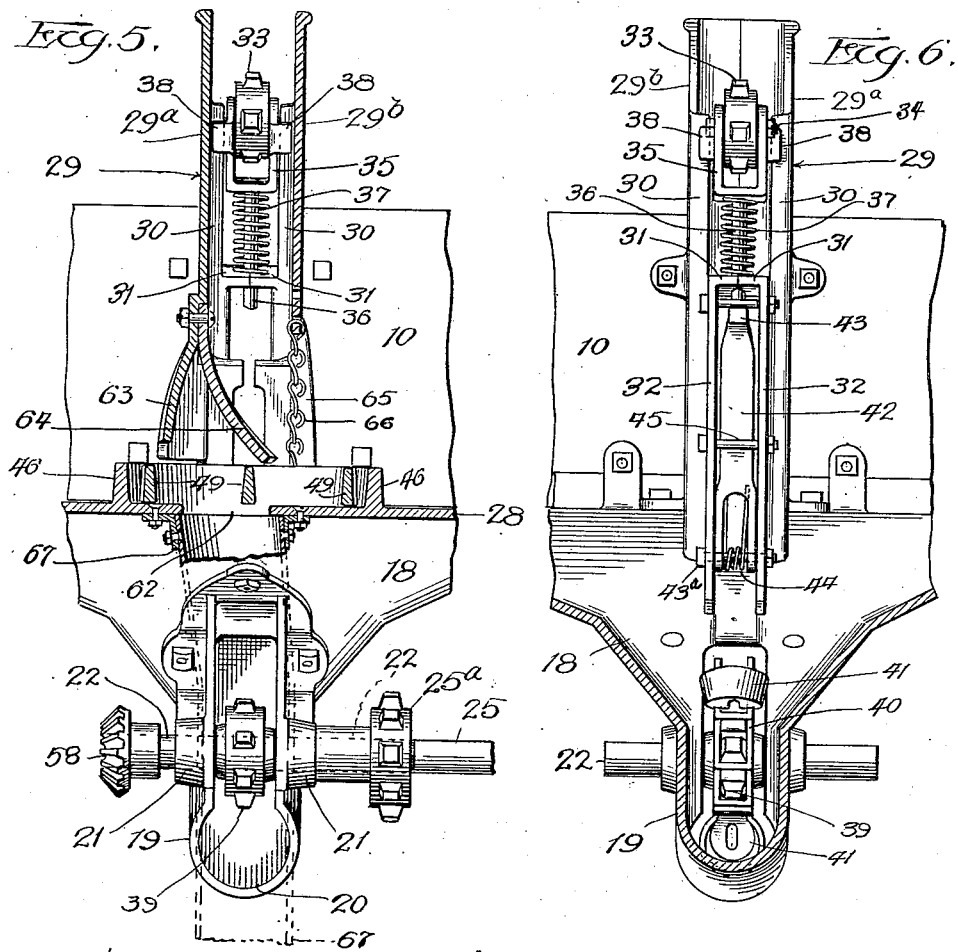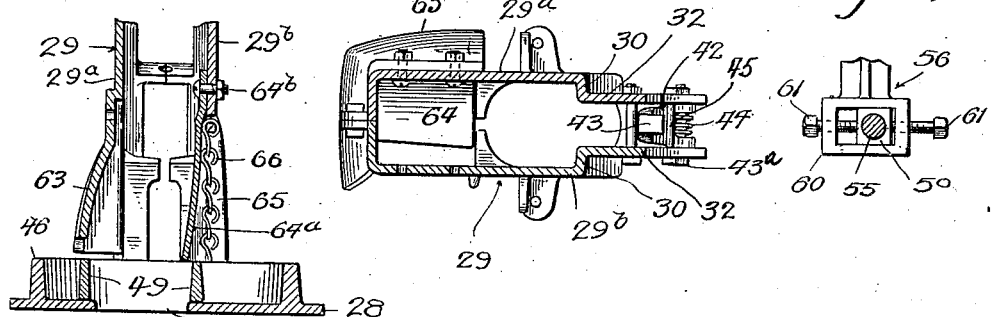

UNITED STATES PATENT OFFICE.

OTTO KNOERZER, OF HAMMOND, INDIANA, ASSIGNOR TO CHAMPION POTATO MACHINERY COMPANY, OF HAMMOND, INDIANA, A CORPORATION OF INDIANA.

POTATO-PLANTER.

1,070,898.

Specification of Letters Patent.

Patented Aug. 19, 1913.

Application filed June 12, 1912. Serial No. 703,127.

*To all whom it may concern:*

Be it known that I, OTTO KNOERZER, a citizen of the United States, residing at Hammond, in the county of Lake and State of Indiana, have invented new and useful Improvements in Potato-Planters, of which the following is a specification.

This invention relates to potato planters and has for its main object the production of a potato planter capable of successfully handling seed potatoes in any of the peculiar conditions to which they are subject.

One of the objects of this invention is to provide means whereby individual seed potatoes may be selected from the whole mass and dropped directly into the furrow, or if desired dropped to a star wheel or winged feed wheel, where corrections may be made by hand and thereafter dropped into the furrow by the action of said wheel.

Another object is to provide automatic means for agitating or jarring a certain elevator chain, (which raises the seed potatoes into position to be discharged into the delivery chute) and thereby shake off the excess potatoes, thus insuring the delivery of but one seed potato at a time.

Another object is to provide a potato planter capable of being handled by but one attendant when the seed potatoes are in suitable condition, but arranged so that two attendants may be employed to effect the successful operation of the machine, when the seed potatoes are in a condition difficult to handle.

Other objects and advantages will occur in the course of this specification and with all of said objects and advantages in view, this invention consists in the several novel features hereinafter fully set forth and particularly defined in the claims.

Figure 4:
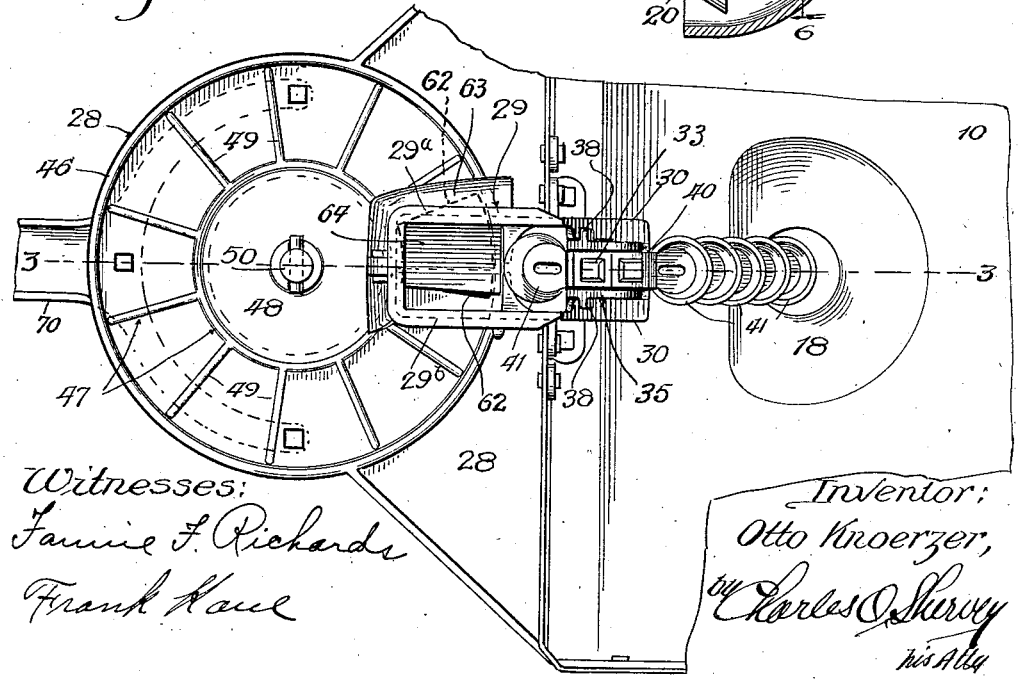

The invention is clearly illustrated in the drawings furnished herewith, in which:

Figure 1 is a side elevation of a potato planter embodying one form of the invention, certain parts thereof being illustrated in dotted lines, to more clearly illustrate the present invention, Fig. 2 is a view of certain parts seen in Fig. 1, the view being partly in plan and partly in horizontal section, taken on the line 2—2 in Fig. 1, Fig. 3 is a detail central longitudinal section of the elevating and feed mechanism taken on the line 3—3 of Fig. 4, Fig. 4 is a plan of the parts seen in Fig. 3, Fig. 5 is a detail vertical cross section taken on the line 5—5 of Fig. 3, Fig. 6 is a detail vertical section taken on the line 6—6 of Fig. 3, Fig. 7 is a horizontal section taken on the line 7—7 of Fig. 3, Fig. 8 is a detail vertical section taken on the line 8—8 of Fig. 2, and Fig. 9 is a fragmental transverse section of the housing seen in Figs. 3 to 6, but showing a different form of deflecting plate used in connection therewith.

In the embodiment of the invention illustrated in the drawings 10, designates the seed box of a planter, which box is supported upon side frames 11, carried by wheels 12, that are fast upon a shaft or axle 13, which is journaled in bearings carried by the side frames 11. The planter is provided with the usual furrow openers 15, fertilizer mechanism 16, covering disks 17, and their supports, and as these parts form no particular part of the present invention, they will not be described in detail in this specification. The seed box 10, has a downwardly tapering hopper-like bottom 18, at the lower end of which is an arc shaped conduit 19, substantially circular in cross section and terminating in an opening 20, (see Figs. 3 and 5). Extending through bearing brackets 21, secured to said bottom 18, is a transversely extending shaft 22, concentrically arranged with respect to the conduit 19, and driven from the shaft 13, of the supporting wheels of the planter. The means for driving said shaft 22, may comprise a gear wheel 23, fast upon the shaft 13, and a pinion 24, fast upon an extension 25, of the shaft 22. As shown, the inner end of the shaft extension 25, is squared and fits in a square hole in the end of a sprocket wheel 25ª, which is employed to drive certain other mechanical parts of the planter and is secured to one end of the shaft 22. The outer end of the shaft 25, is slidably carried in a slot formed in one side frame 11, and is held in position by a link 26, and a hand lever 27, and segment 27ª. The object of this arrangement is to enable the pinion 24, to be removed from its shaft and another one of different diameter to be placed thereon in its stead for timing the elevating and feed mechanism.

At the top of the flaring bottom portion 18, of the seed box is a rearwardly extending table 28, above the forward end of which is a housing 29, forming the upper part of a delivery chute, through which the seed potatoes are dropped one after the other by the elevating mechanism hereinafter described; said housing is preferably made of two substantially similar halves 29ª, 29ᵇ, bolted together along the middle line of the housing. The housing is open at its top, bottom and front, the latter extending in an oblique, rearwardly inclined direction, and being partly closed by flanges 30, which terminate somewhat below the top of the housing. At a point below the top of the flanges 30, the front is formed with transverse approximately horizontal flanges 31, that extend at right angles to the flanges 30, and below said transverse flanges the housing is formed with parallel side walls 32, whose forward edges are approximately parallel with the oblique front of the housing. Yieldingly supported above the said flanges 31, is a sprocket wheel 33, carried by a shaft 34, mounted in a bracket 35, having a downwardly extending post 36, which is guided in a central perforation in the meeting edges of the flanges 31. Between the bottom of said bracket 35, and top of the flanges 31, is a coiled compression spring 37, which acts to yieldingly support the bracket 35, and sprocket wheel carried thereby. Said bracket is formed with two grooved lugs 38, each of which embraces one of the flanges 30, of the housing (see Figs. 4, 5 and 6) to guide the upper end of the bracket in a line substantially parallel with the oblique front of the housing, the lower end is guided by the post sliding in the hole in the flanges 31.

The shaft 22, bears a sprocket wheel 39, immediately above the conduit opening 20, and trained around said sprocket wheels 33, 39, is a sprocket chain 40, certain of the links of which are formed with seed cups 41, of the general contour seen in Figs. 3 and 4, which cups are adapted to lift the seed potatoes from the seed box and discharge them one after the other into the housing 29, from which they are thereafter delivered to the furrow. In general said seed cups are substantially circular in plan and taper somewhat toward their bottom portions, where they are preferably perforated.

It will be observed that by reason of the arc shaped conduit 19, at the bottom of the seed box and by reason of the proper spacing of the seed cups, no gate or closure is required at the entrance opening to the bottom of the seed box, for the reason that at least one of said seed cups at a time occupies a position in said arc shaped conduit, the one cup entering said passage at or just before the preceding one leaves the same, so that there is no danger of any of the seed potatoes escaping through the opening in the bottom of the seed box.

To prevent more than one seed potato being carried up in any given seed cup, I provide an agitator, here shown as comprising a vibratory arm 42, pivoted upon one of the bolts 43ª, that fastens the two halves of the housing together. Said arm extends upwardly between the side walls 32, of the housing and is formed with a head 43, that projects forward into the path of the cross bars of the links of the sprocket chain. The lower end of the arm is forked as shown in Fig. 6, and encircling said bolt 43ª between the arms of the fork is a coiled spring 44, one end of which engages with the rear of the arm 42, and the other end engages with the bottom of the seed box, said spring acts to yieldingly press the upper end of the arm 42, toward the sprocket chain. It is evident that as the links of the sprocket chain pass by the head 43, of the arm 42, the cross bars of the links force the arm back against the action of the spring, but said spring throws the head back again against the chain, thus rattling or vibrating the same, and shaking off any potatoes that may have lodged on the seed potato in the cup. To regulate the intensity of the stroke, means are provided for limiting the movement of said arm in a direction toward the chain, and said means are here shown as comprising a bolt 45, which extends through oblique slots 46ª in the side walls 32, of the housing and against which said arm strikes. The threaded end of said bolt bears a nut, and by unscrewing said nut, raising said bolt in the slots 46ª, and tightening up the nut, the forward movement of the arm 42, is thereby restricted. While the function of the agitator is to jar the chain and dislodge any seed potatoes that may have lodged over the one in the seed cup, under certain conditions it is necessary to jar the chain more than at other times. This may be accomplished by proper adjustment of the bolt 45.

The table 28, has a circular flange 46, projecting upward from its upper surface, and rotatively mounted in the space surrounded by said flange is a star wheel or winged feed wheel 47, which may be geared to rotate in synchronism with the movement of the sprocket chain. Said wheel is here shown as comprising a central, downwardly flanged disk 48, formed with radial vertical wings 49, projecting out from the flange of the disk 48. A vertically and downwardly extending shaft 50, secured to said wheel 47, is journaled in a downwardly extending boss 51, formed on the lower side of the table 28, and in a bearing bracket 52, carried by said table 28. A beveled gear wheel 53, mounted upon said shaft 50, near its lower end meshes with a beveled pinion 54, mounted upon a counter shaft 55, journaled in the bracket 52, and in a bracket 56, extending down from the table 28. The other end of said counter shaft 55, bears a beveled pinion 57, which meshes with a bevel pinion 58, mounted on one end of the shaft 22, (see Fig. 2). I have shown the shaft 55, as capable of a limited amount of horizontal movement whereby the beveled pinions 57, 58, may be thrown into or out of mesh and as shown, the means for effecting said movement of the shaft 55, comprises a bearing block 59, in which is journaled the shaft 55, said block being slidably mounted in an opening in the head 60, of the bearing bracket 56, and held in position therein by means of set screws 61, threaded in the head and bearing against the sides of the block. By unscrewing one set screw and screwing up the other set screw, the block may be moved from one side to the other of the opening in the head whereby the shaft is correspondingly moved, thereby throwing the beveled pinions 57, 58, into or out of mesh as the case may be.

The housing 29, partly overhangs the feed wheel 47, and the lower end of said housing, adjacent the feed wheel, is cut away to permit the feed wheel to rotate thereunder. An opening 62, is formed in the table 28, below the overhanging portion of said housing 29, the major portion of said opening being to one side of the vertical center of the housing, and the section 29$^a$, of said housing is formed at its lower end with an outwardly and downwardly curved portion 63, that overhangs and covers the opening 62, in the table 28. The section 29$^b$, has a lateral discharge opening 65, and opposite said opening is a deflecting plate 64, (see Figs. 3, 4, and 5) which is secured to the inner face of the section 29$^a$, of the housing as shown, and said plate projects over the opening 62, and toward the bottom of the opening 65, whereby when said deflecting plate 64, is used, any seed potatoes dropped upon it will be discharged through the lateral opening 65, and upon the platform 28, between two wings of the feed wheel. A gate 66, is hung in said opening 65, and arrests the seed potato as it passes said opening 65, whereby there may be no tendency for it to roll out of the pocket formed by two adjacent wings of the feed wheel and the flanged table 28. Said gate is shown in the drawings as comprising a number of chains placed side by side and secured to the section 29$^b$, at the top of the opening 65. The elevator chain and feed wheel are so timed with respect to each other that when a seed potato is thrown into the housing 29, (after having been carried up by the elevator chain) and falls to the table 28, one of the pockets formed by the wings of the feed wheel and table is in position to receive such seed potato, after which it is carried around by said feed wheel until that pocket registers with the opening 62, in the table, whereupon said seed potato is free to drop into the lower portion 67, of the delivery chute, through which it falls into the furrow. With the use of the feed wheel 47, the attendant may readily observe if the several pockets are properly filled with seed potatoes and if not, may make corrections by placing a seed potato in an empty pocket, and if more than one happens to be in a pocket he may remove one and thereafter place it in an empty pocket.

Owing to the peculiar conditions of seed potatoes, it is sometimes possible to drop them regularly without the aid of the feed wheel 47, and in such cases the gearing between the feed wheel shaft 50, and shaft 22, may be disconnected and a different deflecting plate substituted for the one shown in Figs. 3, 4 and 5. In this case the plate 64, is detached from the housing and a substitute plate 64$^a$, employed, (see Fig. 9) which is secured to the inner side of the section 29$^b$, of the housing, as for instance by means of bolts and nuts 64$^b$ and said deflecting plate 64$^a$, lies in a more upright position than does the plate 64, being arranged to direct the seed potatoes directly to the opening 62, instead of projecting them out through the lateral opening 65. In this case it is necessary, of course, to turn the feed wheel 47, into position where the potatoes are free to fall between two of its wings.

For convenience I have illustrated two seats 68, 69, for accommodating two attendants, the one seat 68, being supported from the table 28, by a bracket 70, secured to the table, and the seat 69, being supported at the front end of the machine. When the use of the feed wheel 47, is necessary, one of the attendants sits upon the seat 69, and drives the horses, whereas the other attendant sits upon the seat 68, and makes the necessary corrections in the feed wheel.

The operation of the machine is readily apparent from the above description.

The forward motion of the machine causes the elevator chain to be moved in a direction to pick up seed potatoes from the seedbox, raise them to the top of the housing and discharge them into the latter, and when the feed wheel 47, is used, they are discharged laterally by means of the plate 64, into an adjacent pocket on the table 28. The feed wheel is rotated through the instrumentality of the gearing between its shaft and the shaft 22, thereby carrying the seed potatoes around until they fall, one by one, through the opening 62, in the table, from which they are conducted to the furrow by the delivery chute 67. In case it is found that the seed potatoes clog and hang together the agitator is allowed to strike the chain more violently, whereas if the potatoes seem to be quite free of each other, the bolt 45, is raised sufficiently to prevent such violent agitation of the chain. If it is found that the seed is in such condition that planting is free and regular, the deflecting plate 64, may be detached and the plate 64$^a$, secured to the housing to take its place, and the pinions 57, 58, thrown out of mesh, whereupon the potatoes will be dropped directly from the elevator into the delivery chute, without first passing around upon the table for correction.

I realize that various alterations and modifications of this device are possible without departing from the spirit of my invention, and I do not therefore desire to limit myself to the exact form of construction shown and described.

I claim as new and desire to secure by Letters Patent:

1. A potato planter of the class described, in which is combined a seed box, a seed elevating chain having seed cups thereon, and extending up from said seed box, a delivery chute into which said chain discharges the seed, said chute having a lateral opening intermediate its ends, and a deflecting plate opposite said opening and arranged to deflect the seed out through said lateral opening, a feed wheel rotatable across said delivery chute below said lateral opening and deflecting plate, and adapted to receive the seed from said deflecting plate, and carry the same around to the chute at a point below the deflecting plate.

2. A potato planter of the class described, in which is combined a seed box, a seed elevating chain having seed cups thereon, and extending up from said seed box, a delivery chute into which said elevating chain discharges the seed, said chute having a direct passage therethrough, and a lateral opening intermediate its ends, a feed wheel rotatable across said delivery chute below said lateral opening therein and a deflecting plate removably secured in said chute over said feed wheel and adapted to deflect the seed out through said lateral opening to the feed wheel, said deflecting plate being capable of removal to permit the seed to fall directly through said chute.

3. A potato planter of the class described, in which is combined a seed box, a seed elevating chain having seed cups thereon, and extending up from said seed box, a drive shaft and sprocket thereon for driving said elevating chain, a delivery chute into which said chain discharges the seed, said chute having a lateral opening intermediate its ends and a deflecting plate opposite said opening and arranged to deflect the seed out through said lateral opening, a feed wheel rotatable across said delivery chute below said lateral opening and deflecting plate, and adapted to receive the seed from said deflecting plate, and carry the same around to the chute at a point below the deflecting plate, a vertical shaft secured to said feed wheel, and a counter shaft geared to said drive shaft and vertical shaft.

4. In a potato planter of the class described, in which is combined a delivery chute having a direct passage therethrough and a lateral opening in its side, a removable deflecting plate in said chute opposite said lateral opening and arranged to deflect seed out through said lateral opening, and a plurality of linked members secured to said chute and hanging across said lateral opening, substantially as and for the purpose set forth.

5. In a potato planter of the class described, in which is combined a seed box, a support having two sides projecting up therefrom, upper and lower sprocket wheels, the upper one of which is carried by said support and the lower one of which is a driven one, a sprocket chain, trained around said sprocket wheels, and having seed cups formed on certain of its links, an agitator arm pivotally mounted between the sides of said support and having on its free end a head arranged in the path of movement of the chain, and a spring for swinging said arm against the chain.

6. In a potato planter of the class described, in which is combined a seed box, a support therein and extending up therefrom, a sprocket chain traveling along said support, and having seed cups formed on certain of its links, an agitator arm pivotally mounted on said support and having a head arranged to contact with the cross bars of said chain, said arm being spring pressed in a direction toward the chain, a bolt secured in said support in position to limit the movement of the arm toward the chain, and means for varying the position of said bolt with respect to said chain, whereby the force of the blow against the chain may be regulated.

7. In a potato planter of the class described, in which is combined a seed box, a housing supported therein, an upper sprocket wheel carried by said housing, a lower driven sprocket wheel at the bottom of said seed box, a sprocket chain trained over said sprocket wheels, and having seed cups formed on certain of its links, a spring pressed agitator arm, pivotally mounted on said housing and having a head adapted to enter the link openings of said chain and strike against the cross bars thereof and a bolt adjustably secured in oblique slots in the housing in front of said agitator arm, and arranged to limit its stroke.

In witness whereof, I have hereunto signed my name at Hammond, Lake county, Indiana, this 6th day of June 1912.

OTTO KNOERZER.

Witnesses:
C. H. LASATER,
LEONARD KNOERZER.

Copies of this patent may be obtained for five cents each, by addressing the "Commissioner of Patents, Washington, D. C."